US00RE38300E

(19) United States
(12) Reissued Patent
Englund et al.

(10) Patent Number: US RE38,300 E
(45) Date of Reissued Patent: Nov. 11, 2003

(54) NON-FLUID CONDUCTING PRESSURE MODULE HAVING NON-CONTAMINATING BODY AND ISOLATION MEMBER

(75) Inventors: Diane L. Englund, Minneapolis, MN (US); Gerald R. Cucci, Minneapolis, MN (US)

(73) Assignee: NT International, Inc., Fridley, MN (US)

(21) Appl. No.: 09/502,735

(22) Filed: Feb. 11, 2000

Related U.S. Patent Documents

Reissue of:
(64) Patent No.: 5,852,244
Issued: Dec. 22, 1998
Appl. No.: 08/980,744
Filed: Dec. 1, 1997

U.S. Applications:
(63) Continuation of application No. 08/538,478, filed on Oct. 3, 1995, now Pat. No. 5,693,887.

(51) Int. Cl.[7] ..... G01L 7/00; G01L 7/08; G01L 9/00

(52) U.S. Cl. ..... 73/706; 73/715; 73/756

(58) Field of Search ..... 73/706, 708, 715, 73/723, 724, 756; 361/283.4; 338/4, 42

(56) References Cited

U.S. PATENT DOCUMENTS

| | | | | |
|---|---|---|---|---|
| 2,190,713 | A | 2/1940 | Hintze et al. | 123/169 |
| 2,734,526 | A | 2/1956 | Aagaard | 137/486 |
| 3,645,139 | A | 2/1972 | Zavoda | 73/406 |
| 3,930,823 | A | 1/1976 | Kurtz et al. | 65/33 |
| 4,010,769 | A | 3/1977 | De Lorenzo et al. | 137/312 |
| 4,127,840 | A | 11/1978 | House | |
| 4,177,496 | A | 12/1979 | Bell et al. | 361/283 |
| 4,192,192 | A | 3/1980 | Schnell | 73/715 |
| 4,252,510 | A | 2/1981 | Bromley | 417/534 |
| 4,322,980 | A | 4/1982 | Suzuki et al. | 73/727 |
| 4,343,456 | A | 8/1982 | Zitzloff | 251/255 |
| 4,461,181 | A | 7/1984 | North, Jr. | 73/749 |
| 4,507,973 | A | 4/1985 | Barr et al. | 73/724 |
| 4,653,330 | A | 3/1987 | Hedtke | 73/756 |
| 4,683,755 | A | 8/1987 | Samek | |
| 4,994,781 | A | 2/1991 | Sahagen | |
| 5,063,784 | A | 11/1991 | Ridenour | 73/756 |

(List continued on next page.)

FOREIGN PATENT DOCUMENTS

| | | |
|---|---|---|
| JP | 05-033044 U | 4/1993 |
| JP | 6-129927 | 5/1994 |
| JP | 06-129927 | 5/1994 |
| JP | 07-072029 A | 6/1994 |

(List continued on next page.)

*Primary Examiner*—William Oen
(74) *Attorney, Agent, or Firm*—Patterson, Thuente, Skaar & Christensen, P.A.

(57) ABSTRACT

A non-contaminating pressure transducer module having an isolation member is disclosed. The isolation member isolates a pressure sensor within the transducer module from exposure to fluids flowing through a conduit in the module. The transducer module may be positioned in-line within a fluid flow circuit carrying corrosive materials, wherein the pressure transducer module produces a control signal proportional to either a gauge pressure or an absolute pressure of the fluid flow circuit. The pressure transducer module of the present invention also avoids the introduction of particulate, unwanted ions, or vapors into the flow circuit.

45 Claims, 8 Drawing Sheets

U.S. PATENT DOCUMENTS

| | | | | |
|---|---|---|---|---|
| 5,088,329 | A | 2/1992 | Sahagen | 73/727 |
| 5,137,026 | A | 8/1992 | Waterson et al. | 128/725 |
| 5,167,158 | A | 12/1992 | Kamachi et al. | |
| 5,174,926 | A | 12/1992 | Sahagen | |
| 5,183,078 | A | 2/1993 | Sorrell | 137/883 |
| 5,184,514 | A | 2/1993 | Cucci et al. | 73/706 |
| 5,284,425 | A | 2/1994 | Holtermann et al. | 417/395 |
| 5,287,851 | A | 2/1994 | Beran et al. | 128/204.23 |
| 5,316,035 | A | 5/1994 | Collins et al. | 137/312 |
| 5,347,862 | A | 9/1994 | Ingman | 73/269 |
| 5,357,792 | A | 10/1994 | Getenby | 73/119 A |
| 5,410,916 | A | 5/1995 | Cook | 73/706 |
| 5,563,347 | A | 10/1996 | Martin et al. | 73/756 |
| 5,604,315 | A | 2/1997 | Briefer et al. | |
| 5,653,191 | A | 8/1997 | Calhoun et al. | 116/272 |
| 5,654,512 | A | 8/1997 | Harnett et al. | 73/861.53 |
| 5,656,780 | A | 8/1997 | Park | 73/724 |
| 5,657,001 | A | 8/1997 | Wilson | 340/611 |
| 5,668,322 | A | 9/1997 | Broden | 73/756 |
| 5,693,887 | A | 12/1997 | Englund et al. | 73/723 |
| 5,822,173 | A | 10/1998 | Dague et al. | 361/283.3 |
| 5,878,000 | A | 3/1999 | Dubois | 367/188 |

FOREIGN PATENT DOCUMENTS

| | | |
|---|---|---|
| JP | 07072029 | 3/1995 |
| JP | 08313379 A | 5/1995 |
| JP | 08-313379 | 5/1995 |
| JP | 2552093 | 11/1996 |

NON-FLUID CONDUCTING PRESSURE MODULE HAVING NON-CONTAMINATING BODY AND ISOLATION MEMBER

Matter enclosed in heavy brackets [ ] appears in the original patent but forms no part of this reissue specification; matter printed in italics indicates the additions made by reissue.

This is a Continuation application of application Ser. No. 08/538,478, filed on Oct. 3, 1995, now U.S. Pat. No. 5,693,887.

BACKGROUND OF THE INVENTION

I. Field of the Invention

This invention relates generally to pressure transducers. More particularly, this invention relates to a pressure transducer modules which may be connected in-line in a chemically corrosive fluid flow circuit, wherein the pressure sensor used therein is isolated from the fluid flow circuit with a non-contaminating transducer body.

II. Discussion of the Related Art

During the production of semiconductors, the sensitivity to contamination of materials used to produce them is a significant problem faced by semiconductor manufacturers. Various processing systems have been designed to reduce the amount of foreign particles and vapors generated during the processing of these sensitive materials. It is critical that the semiconductor wafers be isolated from damaging particulate and chemicals.

In an attempt to eliminate all sources of damaging contaminants, the equipment used to process the semiconductor wafers has necessarily been designed with this goal in mind. First, the various components of the processing equipment are commonly designed to reduce the amount of particulate generated and to isolate the processing chemicals from contaminating influences. The processing equipment commonly has monitoring and sensing devices connected in a closed loop feedback which are used in monitoring and controlling the equipment. These monitoring and sensing devices must also be designed to eliminate any contamination which might be introduced.

During the processing of semiconductor wafers, highly corrosive hazardous chemicals are commonly used. When these chemicals are used, extremely severe conditions within or near the processing environment may be encountered. Such corrosive atmospheric environments are extremely hard on the monitoring and sensing equipment. Further, the monitoring and sensing equipment may transmit wafer damaging particulate, ions, or vapors as a result of exposure to the corrosive atmospheric environment. Metals, which are conventionally used in such monitoring devices, cannot reliably stand up to the corrosive environment for long periods to time. Hence, the monitoring and sensing devices must incorporate substitute materials.

The highly corrosive environment may be created when hazardous chemicals are delivered to the processing equipment. Liquid transporting systems carry these chemicals from supply tanks through pumping and regulating stations and through the processing equipment itself. The liquid chemical transport systems, which includes pipes, tubing, valves, and fittings and related devices, are frequently made of plastics resistant to the deteriorating effects of the toxic chemicals. Of course, anything mechanical is subject to potential leakage and such leakage can create extremely hazardous conditions both to the processing of semiconductor wafers or other products and also to personnel who may have to tend and maintain the processing equipment. Hence, the chemical transport system must be designed such that leakage is avoided. The monitoring and sensing devices may incorporate sensors which also must be designed to avoid the introduction of particulate, unwanted ions, or vapors into the processing steps.

An in-line mechanical fluid pressure responsive gauge separated from the fluid flow by a protective membrane is known in the art. The gauge is contained within a housing having a cavity filled with a sensor fluid. The cavity is formed adjacent the fluid flow and separated by the protective membrane. The sensor fluid contained within the cavity is typically a silicone oil. A change in pressure within the fluid flow affects the oil pressure within the cavity. The oil pressure is detected by the mechanical pressure responsive gauge.

The fluid within the cavity typically has large thermo-expansions which cause large deflection changes in the protective membrane. The large deflection changes in the protective membrane increases the likelihood that the fluid within the cavity will leak into the fluid flow, contaminating the flow circuit. Also, the accuracy of the pressure gauge is negatively affected by the large thermo- expansions of the sensor fluid. Hence, a need exists for an in-line pressure gauge that does not leak contaminating fluids into the fluid flow circuit. Also, a need exists for a pressure gauge, wherein the accuracy is not affected by thermo- changes within the fluid flow circuit.

Collins et al., in U.S. Pat. No. 5,316,035 (the '035 patent) describes the use of a capacitance proximity monitoring device in corrosive atmosphere environments. In one embodiment of the '035 patent, the capacitance proximity device is described as being incorporated into a functional apparatus, such as a valve or coupling for tubing. The capacitance proximity device serves as a functional portion of the apparatus and creates a sensing field within a predetermined area. It is then used to determine the change of electrical characteristics within the predetermined area as various fluids flow past the predetermined area. The current related to the sensing field changes when the liquid target media is present, versus air or gas in the tubing when the liquid target media is absent, thereby producing an indication of the presence or absence of the target media. The complex valving often includes a fluid which may leak into and contaminate the processing fluid flow.

The '035 patent does not disclose or even consider a device capable of determining various pressures within the chemical transport system of the processing equipment. Monitoring the pressure within the chemical transport system is useful for several reasons. First, a change in pressure within the system may be indicate leakage within the system. Second, the pressure within the transport system is regulated to avoid exceeding predetermined safety limits. Third, the pressure within a fluid flow circuit may be controlled to actuate various processing tools connected to the processing equipment.

Therefore, a need exists for a non-contaminating pressure transducer which may be positioned in-line within a fluid flow circuit carrying corrosive materials, wherein the pressure transducer determines either a gauge pressure or absolute pressure of the fluid flow circuit. A need also exists for a pressure transducer that avoids the introduction of particulate, unwanted ions, or vapors into the flow circuit. The present invention overcomes these and other disadvantages of the related art.

SUMMARY OF THE INVENTION

The purpose of the present invention is to provide a pressure transducer module that may be coupled in-line to a flow circuit of corrosive fluid, wherein either the gauge pressure or absolute pressure within the flow circuit may be determined. The pressure transducer module includes a pressure sensor within an non-contaminating body. In the preferred embodiment, the components of the pressure transducer module includes a housing, a cap, an electrical connector, pressure fittings, an isolation membrane, a pressure sensor, electronic circuitry, a spacer ring and a hold down ring.

The cap of the housing is removably attached to the housing by mating threads formed on an internal surface of the cap and on the external surface of the housing. An electrical connector is mounted into the cover, allowing electrical leads within the housing to mate with external conductors when the cover is attached.

The housing has a bore extending therethrough, which forms a passage or conduit through which fluids flow, when the transducer is connected in-line within a fluid flow circuit. Aligned and sealably connected to each open end of the bore are pressure fittings. The pressure fittings are constructed from a chemically inert material and are readily available and known to those skilled in the art. The housing also has a cavity extending from an external surface thereof in communication with the bore. A lip is preferably formed in the housing at the intersection of the cavity and bore. The lip has an inner dimension that is less than the inner dimension of the housing. The isolation membrane, pressure sensor, electronic circuit, spacer ring and hold down ring are all contained within the cavity of the housing.

The isolation membrane is sealed against the lip of the housing within the cavity. In this manner, the cavity of the housing is isolated from the fluid flow. The isolation membrane is preferably constructed of an anti-corrosive, chemically inert material with Polytetrafluoroethylene being preferred. The pressure sensor is bonded, pressed, heat welded or otherwise attached to the isolation membrane. The pressure sensor may be of a capacitance or piezoelectric type. A hybrid or fully integrated electronic circuit disposed in the housing is operatively coupled to the pressure sensor and to the aforementioned connector.

The electronic circuit develops a signal which is a measure of the pressure within the flow circuit from information sensed by the pressure sensor. This electronic circuit may also be used in combination with temperature sensitive components to adjust the pressure measurement based upon temperature changes within the flow circuit. As mentioned, the electronic sensor is coupled by electrical leads to the electrical connector and power may be transmitted to the electronic circuit through the electrical leads mating at the connector with an external power supply. Further, an analog output such as a standard 4–20 milliamps signal proportional to the calculated pressure may be transmitted through additional electrical leads.

The isolation membrane and pressure sensor are contained within the cavity by a combination of the spacer ring and hold down ring. The hold down ring has threading formed on its surface that mates with threading formed on the internal surface of the valve body defining the cavity.

Without limitation, the housing, isolation membrane, spacer ring, and hold down ring are constructed of the same polymer to avoid leakage when the transducer is subject to thermal expansion. In the preferred embodiment tetrafluoroethylene fluorocarbon polymers are used. These polymers reduce the amount of abraded particulate, are chemically inert, and provide a non-contaminating pressure transducer module.

OBJECTS

It is accordingly a principal object of the present invention to provide a non-contaminating pressure transducer adapted to be connected in-line in a fluid flow circuit.

Another object of the present invention is to provide a pressure transducer module wherein its pressure sensor component is isolated from the fluid flow circuit by a non-contaminating barrier.

Yet another object of the present invention is to provide a pressure transducer module having an isolation member that is in direct contact with a pressure sensor, the isolation member acting to isolate the sensor and associated electronic circuitry from potentially corrosive processing chemicals and precluding introduction of contaminating substances into the processing fluids being transported.

Still another object of the present invention is to provide a pressure transducer wherein a gauge pressure or absolute pressure of the flow circuit is measured non-intrusively.

These and other objects, as well as these and other features and advantages of the present invention will become readily apparent to those skilled in the art from a review of the following detailed description of the preferred embodiment in conjunction with the accompanying drawings and claims and in which like numerals in the several views refer to corresponding parts.

DETAILED DESCRIPTION OF THE PREFERRED EMBODIMENT

Figure 1:
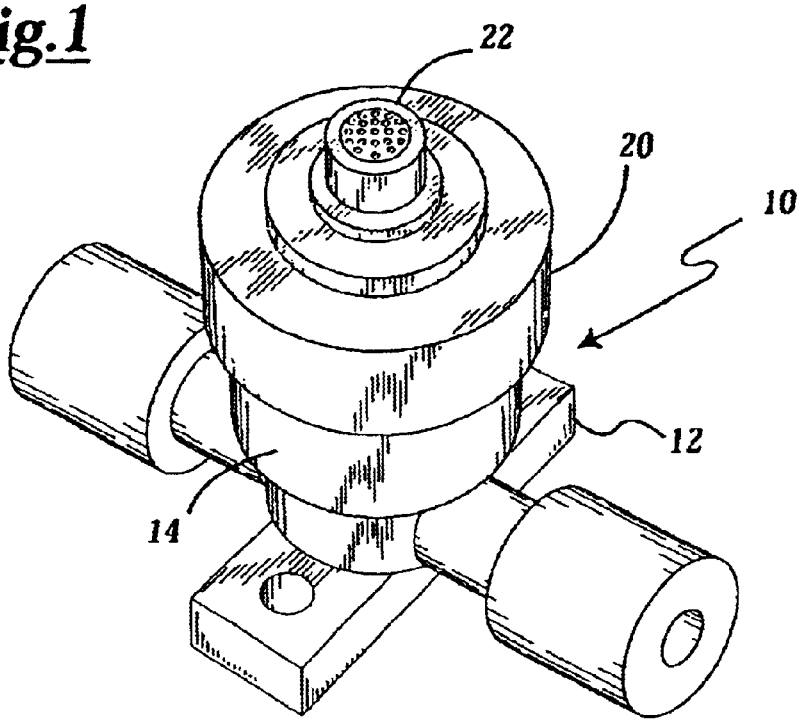
FIG. 1 is a perspective view of the pressure transducer.
Figure 2:
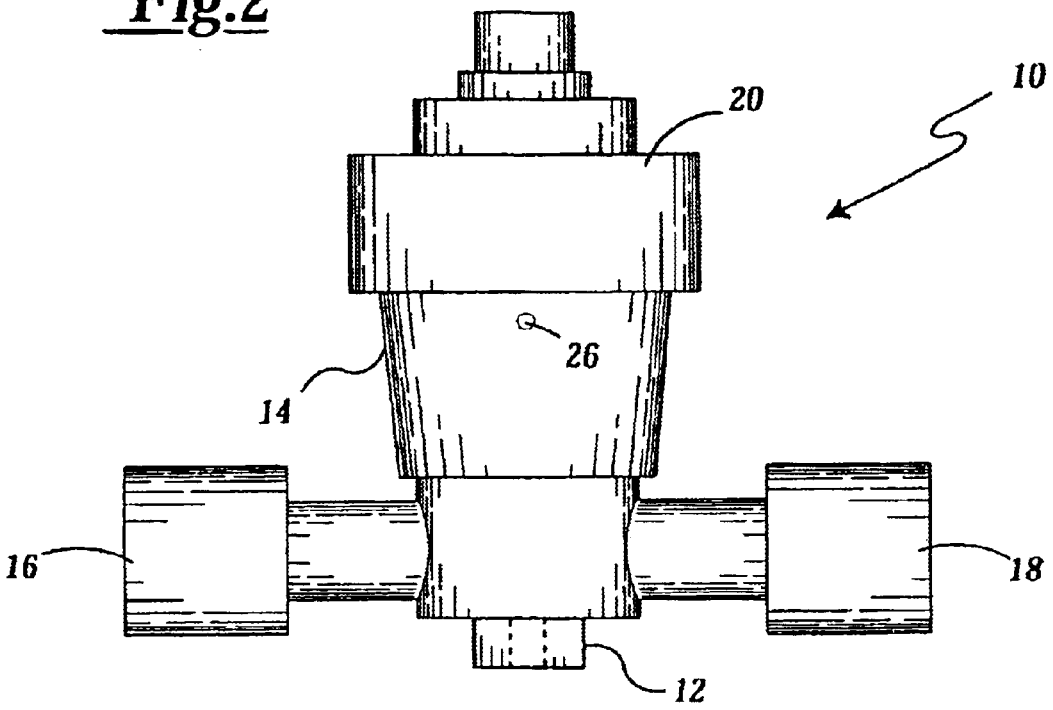
FIG. 2 is a side elevational view of the pressure transducer of the type shown in FIG. 1.

Referring first to FIGS. 1 and 2, the pressure transducer module is generally identified by numeral 10. The pressure transducer is shown as having a base 12 which is used in mounting the pressure transducer module 10 to processing equipment (not shown). The module generally includes a housing or body 14, pressure fittings 16 and 18 and a cover or cap 20. An electrical connector 22 of known construction may be removably attached to the cover 20. The pressure fittings 16 and 18 serve as a inlet and a outlet to the transducer body 14 and are of known construction.

Those skilled in the art will recognize that the pressure transducer housing may take on various shapes, however a generally cylindrical shape as shown is preferred. A cylindrical pressure transducer body is easily manufactured and fluids flow more readily through a cylindrical bore or cavity within the transducer. The housing 14 and cover 20 are preferably manufactured from a chemically-inert, non-contaminating polymer such as a polytetrafluoroethylene.

Figure 3:
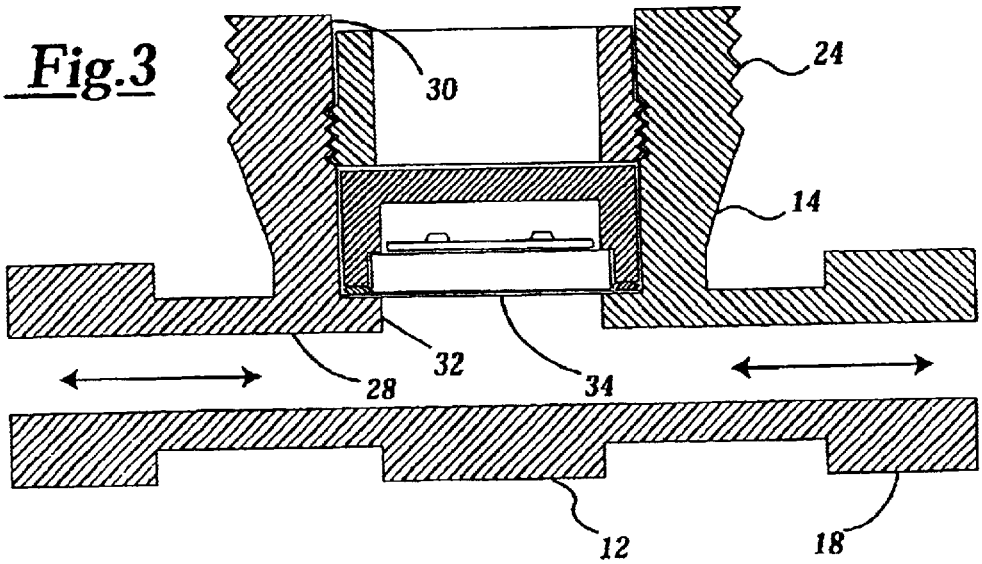
FIG. 3 is a partial, sectioned side elevational view of the pressure transducer module of the type shown in FIG. 1 having the cap removed.

The cover may have threading formed on an internal surface that mates with threading as at 24 in FIG. 3 formed on an external surface of the housing. The cover may thus be screwed to the housing and may further have a suitable o-ring seal (not shown) positioned therebetween to allow the cover to be hermetically sealed to the housing. A vent 26, shown in FIG. 2, may be formed through the housing wall, thereby venting an interior of the housing. The vent 26 allows a pressure sensor contained within the housing to determine a gauge pressure. Without such a vent absolute pressure within the fluid flow circuit is measured. The particular features of the various components of pressure transducer will now be discussed.

Figure 4:
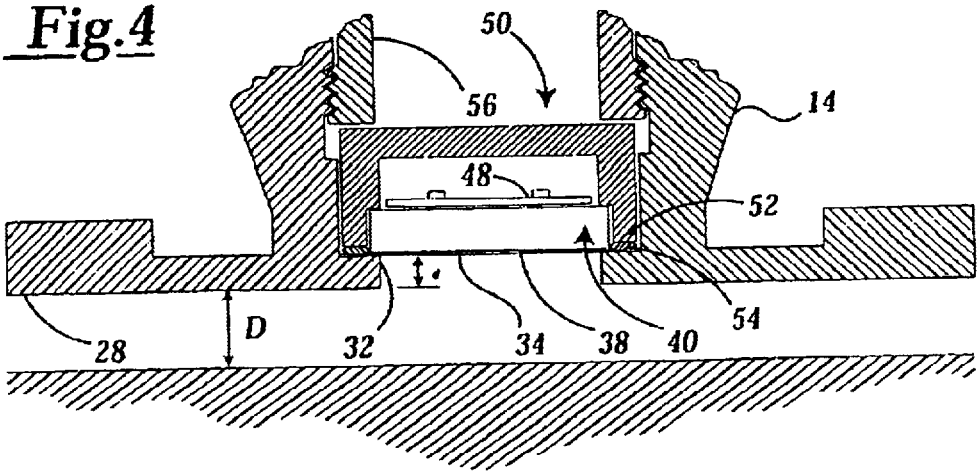
FIG. 4 is an enlarged partial, sectioned view of the pressure transducer module shown in FIG. 3.

Referring to FIGS. 3 and 4, the internal construction of the pressure transducer is shown. A bore 28 extends through the housing forming a conduit, whereby when the pressure transducer module 10 is connected in-line, with a fluid flow circuit, via pressure fittings 16 and 18, the bore 28 serves as a passage within the fluid flow circuit. One end of the bore opening forms the inlet and the other end of the bore forms an outlet to the fluid flow circuit. The orientation of the pressure transducer module within the fluid flow circuit may be reversed without affecting the effectiveness of the pressure transducer.

A cavity 30 extends all the way from an outer surface of the housing 20 to the bore 28. Near the region within the housing where the cavity 30 and the bore 28 intersect, an annular lip 32 is formed. The lip 32 further defines an opening to the cavity from the bore. As further discussed below, the lip may have various shapes.

A thin flexible polymer disk membrane 34 is positioned on the lip 32 of the cavity. In the preferred embodiment both the housing 14 and the flexible membrane 34 are manufactured from tetrafluoroethylene fluorocarbon polymers. One such tetrafluoroethylene fluorocarbon polymer is sold under the TEFLON® trademark by E. I. duPont Nemours. In the preferred embodiment, the disk membrane is preferably molded rather than sprayed or manufactured by some other process that may leave pinhole paths therein. When the pressure transducer module is fully assembled, the annular surface contact between the flexible membrane and the housing lip 32 is such that a hermetic seal is formed therebetween.

Figure 5:
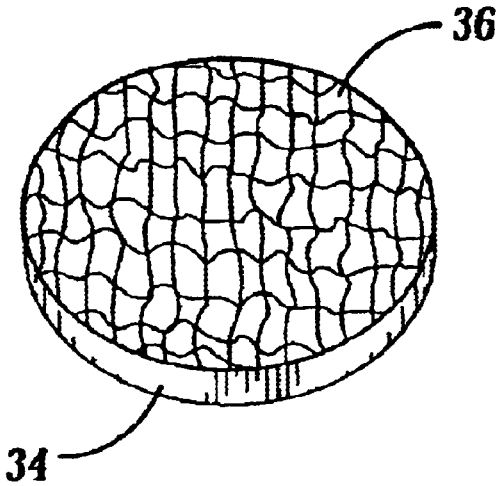
FIG. 5 is a perspective view of the flexible membrane used in the assembly of FIGS. 1 through 3.

Referring next to FIG. 5, the thin, flexible, Teflon membrane 34 is shown in greater detail. Without limitation, the membrane is preferably constructed to have a thickness in a range between 0.001 and 0.040 inches. The upper surface 36 is abraded so as to create a pattern of grooves or channels. Now, when the upper surface 36 of the membrane is pressed against the base 38 of the pressure sensor 40, any air pockets that might otherwise have formed between the sensor base 38 and the membrane are relieved, allowing more intimate contact between the membrane and the pressure sensor 40. The flange 52 of the spacer 50 and the o-ring 54 are dimensioned to allow a slight gap between the sensor 40, o-ring 54, and spacer 50. The inner surface of the spacer 50 may also have a pattern of grooves or channels formed thereon, thereby creating a passage for the relieved air to escape into a central region of the cavity.

Referring again to FIGS. 3 and 4, the pressure sensor 40 is positioned on top of the flexible membrane 34. The pressure sensor may be of a capacitance type or piezoelectric type known to those skilled in the art. The base 38 of the pressure sensor is in direct contact with the membrane and may be either in pressure contact with or bonded to the membrane by an adhesive, thermal welding or by other known means.

Figure 6:
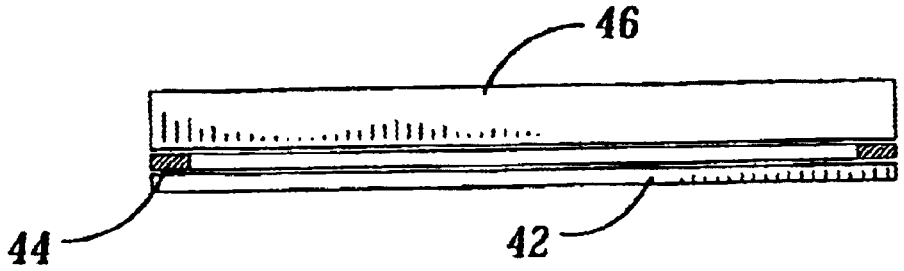
FIG. 6 is a side view of an alumina ceramic capacitive pressure sensor.

In one embodiment generally shown in FIG. 6, an alumina ceramic pressure sensor is comprised of a thin, generally compliant ceramic sheet 42 having an insulating spacer ring 44 sandwiched between a thicker, non-compliant ceramic sheet 46. The first thin ceramic sheet or diaphragm is approximately 0.005 to 0.050 inches in thickness with a typical thickness of 0.020 inches. The thicker ceramic sheet has a thickness range between 0.100 to 0.200 inches. The spacer may be constructed of a suitable polymer. The apposed faces of ceramic disks 42 and 46 are metalized by metals such as gold, nickel or chrome to create plates of a capacitor. A similar capacitive pressure transducer is described by Bell et al. in U.S. Pat. No. 4,177,496 (the '496 patent). Other capacitive pressure transducers similar to that described in the '496 patent are available and known in the art.

Referring again to FIG. 4, an electronic circuit module 48 is positioned above the ceramic pressure sensor 40 and is electrically coupled to the conductive surfaces of the ceramic pressure sensor. The electronic circuit module 48 is also connected by suitable leads, not shown to interval contacts of the connector 22 (FIG. 1). In the preferred embodiment the electrical connector 22 is made of a chemically inert material and preferably may be of a type available from Pneumatico, part number po3rsd-00004-24.

The electronic circuit module 48 develops a control signal proportional to the pressure within the flow circuit using analog information received from the pressure sensor 40 related to changes in its capacitance due to deformation of member 42 by the fluid pressure acting on it. The electronic circuit may also adjust the pressure as the temperature within the flow circuit changes by including a thermistor or like component therein.

In FIGS. 3 and 4, a cup shaped spacer member 50 is disposed above the pressure sensor 40 so as to exert a force on the upper surface of the pressure sensor 40, holding the sensor flat against the membrane 34. The spacer 50 further has a circumferential flange 52 (FIG. 4) which transfer a force against the membrane 34 and lip 32 of the cavity. An o-ring 54 may be positioned between the flange 52 of the spacer and the membrane, wherein through its elastomeric properties, the force may be transferred from the spacer member 50 against the membrane to clamp it against the annular cavity lip 32. A threaded hold down ring 56 is rotated in mating relation with the inner threads of the cavity of the housing or body 14, thereby engaging the spacer member 50 and forcing it against the pressure sensor 40 and membrane 34.

In order to reduce dead space, the distance "d" (FIG. 4) that the flexible membrane is displaced from the lumen of the bore 28 should be kept to a minimum. The decrease in dead space reduces the chance of accumulation of debris and contamination. The decrease in dead space also reduces or eliminates the chance of air bubbles being trapped in the dead space and then suddenly released back into the flow circuit. The release of these air bubbles from the dead space has a negative impact on the semiconductor processing. The inner diameter of the lumen "D" should be equal to or exceed 2*(d). Ideally, the dimension, d, will be far less than the dimension, D, in measurement.

Figure 7:
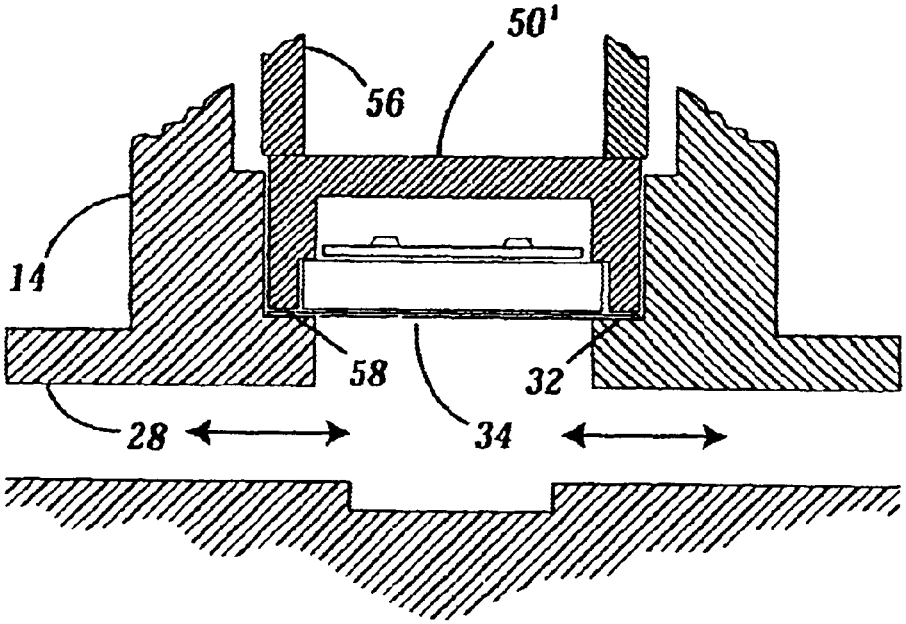
FIG. 7 is an enlarged partial, sectioned side elevational view of an alternate preferred pressure transducer module in accordance with a further embodiment of the invention.
Figure 13:
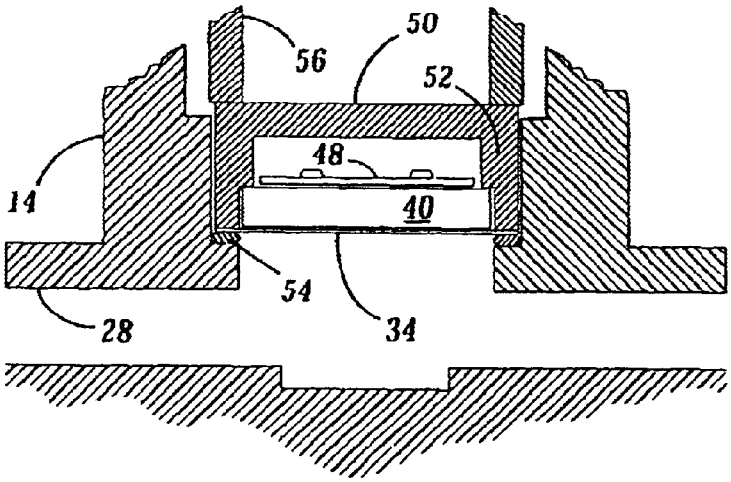
FIG. 13 is an enlarged, partial sectioned side elevational view of yet a further alternate preferred pressure transducer module.

FIG. 7 shows an alternative embodiment wherein the spacer member 50 has rounded edges as at 58. The rounded edges help focus the force of the spacer 50 against the flexible membrane 34 and the lip 32 of the cavity. This arrangement also eliminates the need for the o-ring 54. However, o-ring 54 may be positioned between the membrane and the lip 32 (see FIG. 13). The flange 52 of the spacer 50 and the o-ring 54 are dimensioned to allow a slight gap between the sensor 40, o-ring 54, and spacer 50. The inner surface of the spacer 50 may also have a pattern of grooves or channels formed thereon, thereby creating a passage for the relieved air to escape. Further, the spacer 50' may have a bore extending through a center section, thereby extending the passage into the cavity of the housing.

Figure 8:
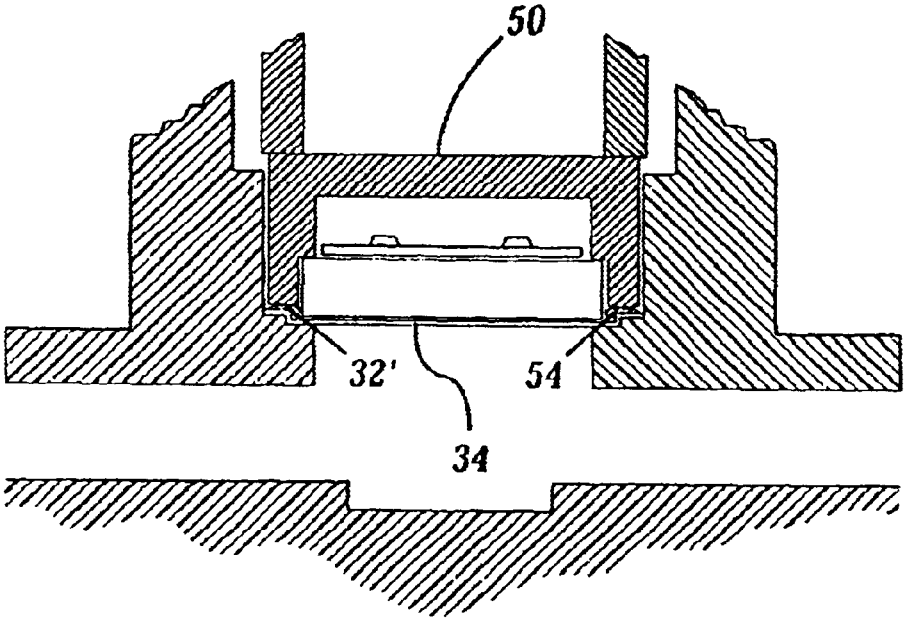
FIG. 8 is an enlarged, partial, sectioned side elevational view of another alternate preferred pressure transducer module.
Figure 15:
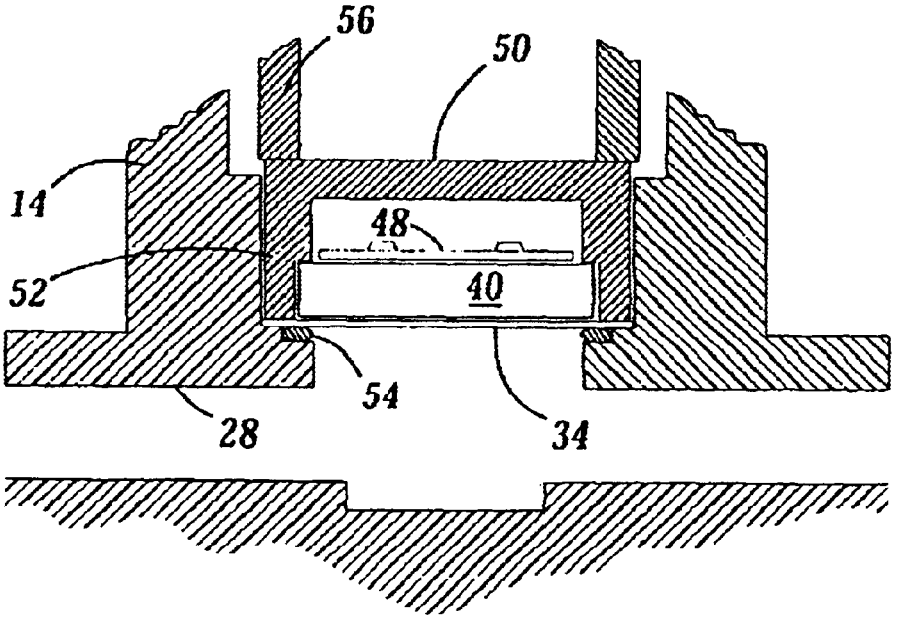
FIG. 15 is an enlarged, partial sectioned side elevational view of yet a further alternate preferred pressure transducer module.

FIG. 8 illustrates another preferred embodiment wherein the lip 32' of the cavity is stepped. The o-ring 54, when compressed by the spacer member 50, is made to conform to the shape of the step and pushes or forces the flexible membrane 34, causing it to bend and mold to the shape of the stepped lip 32 to provide a seal against ingress of fluid. In yet another embodiment, the o-ring 54 may be positioned between the membrane and the lip 32' (see FIG. 15).

Figure 9:
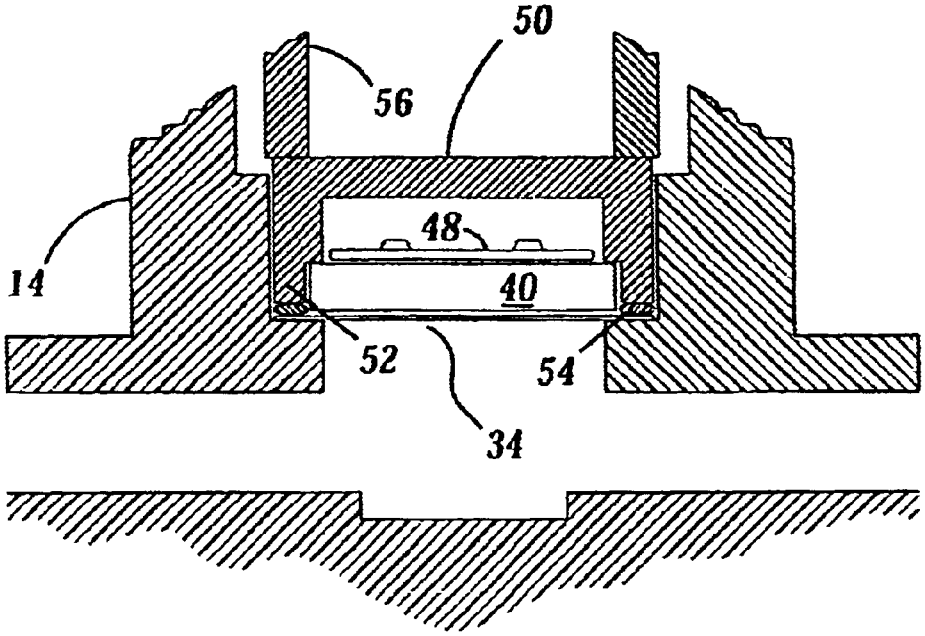
FIG. 9 is an enlarged, partial sectioned side elevational view of still another preferred pressure transducer module.

FIG. 9 illustrates another preferred embodiment having the end of the spacer member flange 52 rounded, wherein the flange is forced against the o-ring 54 which, in turn, forces the o-ring against the flexible membrane 34.

Figure 10:
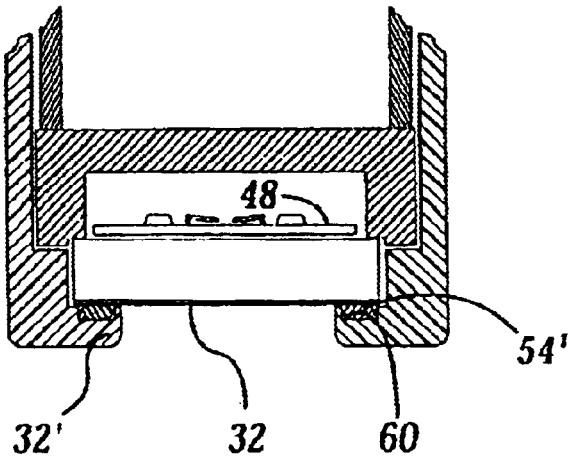
FIG. 10 is yet another enlarged, partial sectioned, side elevational view of a still further alternate preferred pressure transducer module.

FIG. 10 illustrates yet another preferred embodiment wherein the o-ring seal 54' is contained within an annular groove or recess 60 formed within the lip 32'. The flexible membrane 34 is forced against the o-ring 54', sealing the edges of the lip 32' thereby preventing the fluid of the flow circuit from leaking into the cavity of the housing. This shield arrangement is preferred in circumstances where the fluid flow pressure is less than the atmospheric pressure. In such a circumstance, the shield arrangement eliminates the possibility of the o-ring being drawn into the fluid flow circuit.

Figure 11:
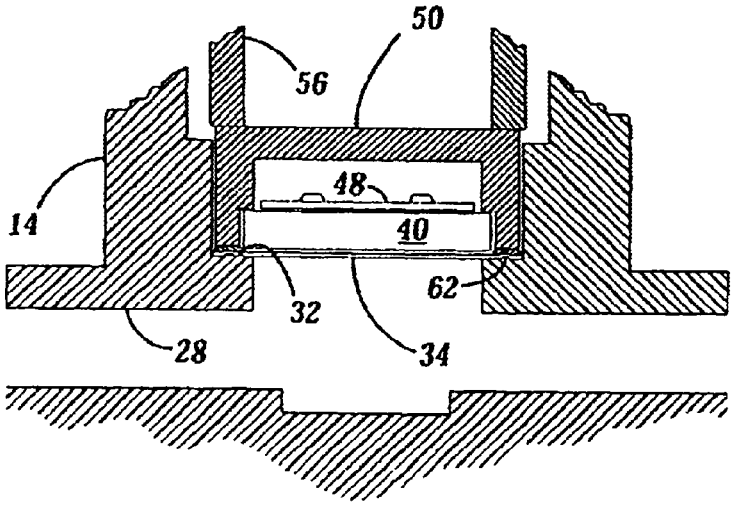
FIG. 11 is an enlarged, partial, sectioned side elevational view of yet another pressure transducer module constructed in accordance with the present invention.

FIG. 11 illustrates yet another embodiment wherein an annular ridge 62 is formed along the surface of the lip 32. When the membrane is compressed against the lip, the membrane conforms to the shape of the ridge. In this manner, an effective seal is formed between the membrane sheet and the housing lip.

Figure 12:
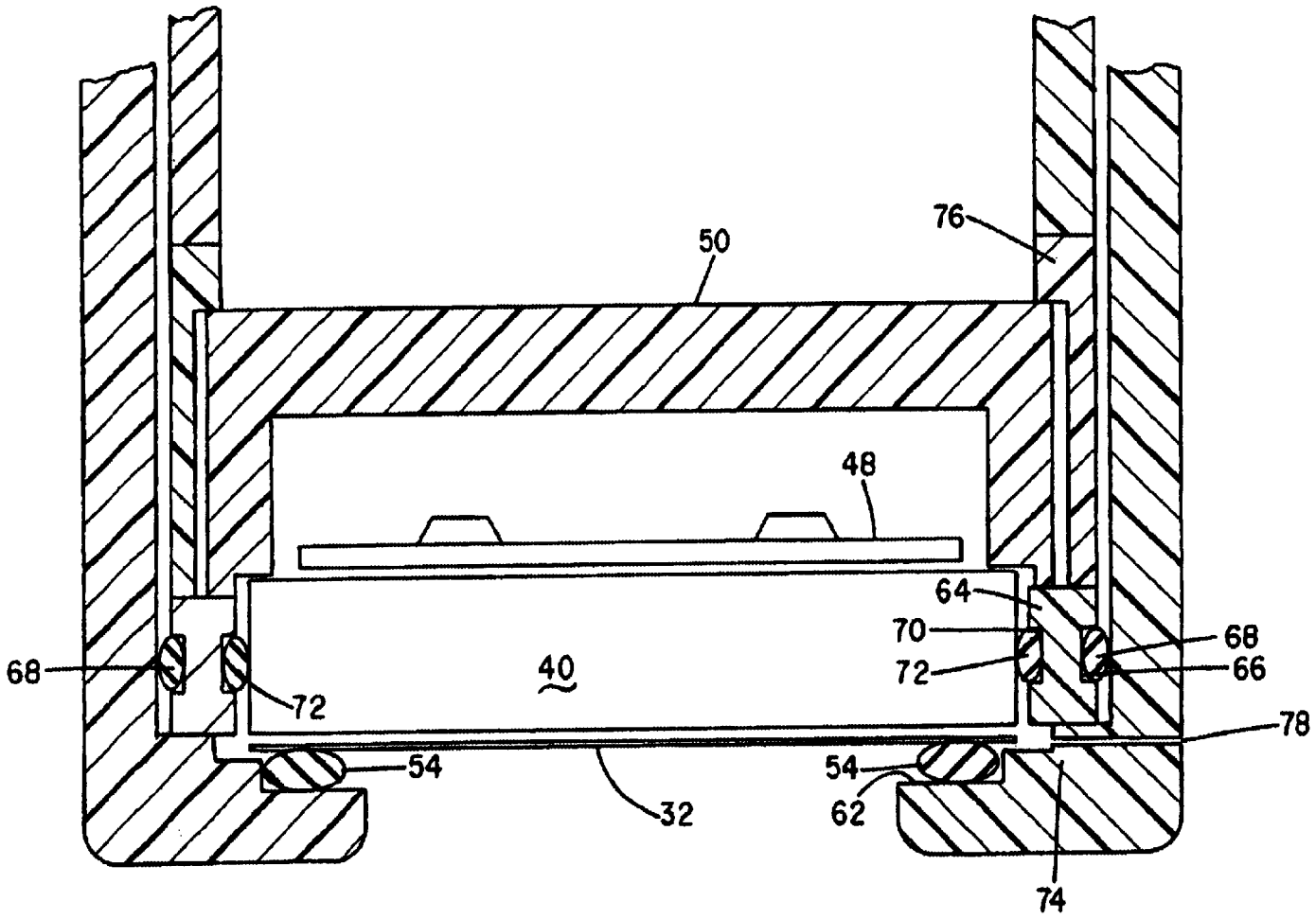
FIG. 12 is an enlarged, partial sectioned side elevational view of yet a further alternate preferred pressure transducer module.
Figure 14:
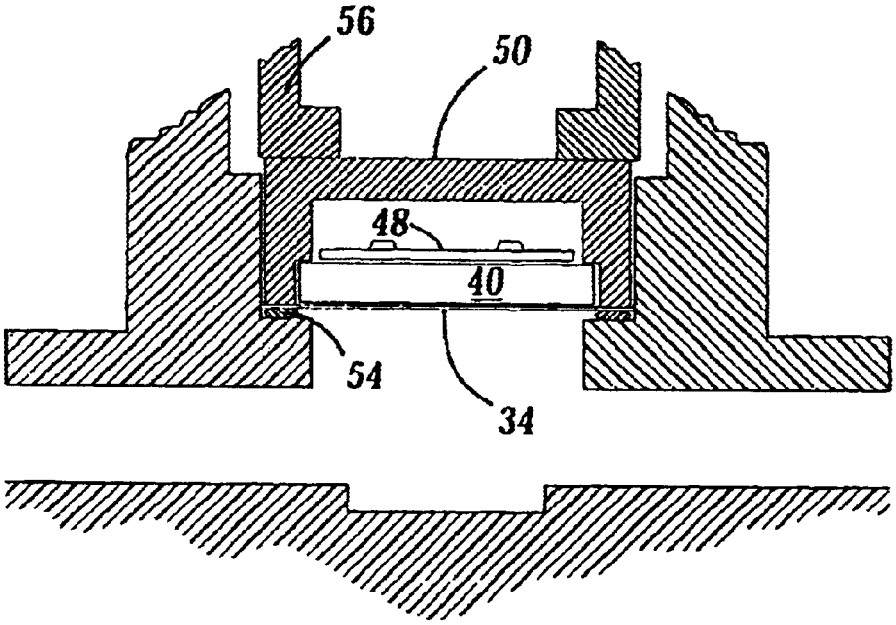
FIG. 14 is an enlarged, partial sectioned side elevational view of yet a further alternate preferred pressure transducer module.

FIG. 12 shows yet another embodiment wherein the lip has a multiple step wherein the o-ring 54 is positioned on the lower step below the membrane 34. An additional annular sealing ring 64 having an external groove 66 for receiving an o-ring 68 and an internal groove 70 for receiving an o-ring 72 provides an additional seal between the housing 14 and the pressure sensor 40. The additional annular sealing ring 64 is shown as being positioned between a top step 74, and the first spacer ring 76. The spacer member 50 is in direct contact with both the first spacer ring 76 and the pressure sensor 40. In this manner, the interior of the housing is sealed from the fluid circuit independently of the seal created between the membrane 34 and the pressure sensor 40. A drain channel 78 extends through the housing 14 to an external surface. The drain channel 78 is positioned between the top step 74 and the lower step to which the seal 54 is in contact. If fluid from the flow circuit leaks past o-ring 54, the drain channel 78 allows this fluid to drain out of the housing without contaminating or affecting the sensor 40.

When the o-ring 54 is positioned on the fluid flow circuit side (see FIGS. 10 and 12–15), the o-ring must be manufactured from a chemically inert material. A perfluoroelastomer, such as KALREZ available from duPont Nemours, Inc., is suitable for this purpose. Other materials such as CHEMRAZ, an elastomeric PTFE available from Greene, Tweed & Co., Inc. is equally suitable.

Having described the constructional features of the present invention the mode of use will now be discussed. The user couples the pressure transducer module 10 into a fluid flow circuit through pressure fittings 16 and 18. As fluid flows through the flow circuit, the pressure distorts the thin ceramic plate 38 of the pressure sensor 40 as a function thereof, and thus changes the capacitance of the ceramic pressure sensor. The change in capacitance is related to the pressure within the flow circuit. This change in capacitance is detected by the electric circuit 48 which, in turn, produces an analog signal proportional to the pressure. The gauge pressure or absolute pressure may equally be determined.

Those skilled in the art will recognize that the transducer output may be calibrated so that minimum output values are associated with minimum pressure and maximum output pressures are associated with maximum pressure. For example, a transducer intended to measure 0 to 100 psig (pounds per square inch gauge) can be calibrated to read 4 mA (milliamps) at 0 psig and 20 mA at 100 psig.

By providing the inert Teflon membrane which is in intimate contact with the ceramic diaphragm 38 of the pressure sensor, the working fluid does not contact the surfaces of the sensor which could lead to contamination. The sealing arrangements disclosed insure that the working fluid does not enter the cavity of the housing 14 and adversely affect the electronic circuity.

This invention has been described herein in considerable detail in order to comply with the patent statutes and to provide those skilled in the art with the information needed to apply the novel principles and to construct and use such specialized components as are required. However, it is to be understood that the invention can be carried out by specifically different devices, and that various modifications, both as to the equipment details and operating procedures, can be accomplished without departing from the scope of the invention itself.

What is claimed is:

1. A chemically inert pressure transducer module adapted to be connected in-line with a fluid flow circuit, comprising:

(a) a chemically inert housing having a bore extending through at least a portion of said housing, wherein an inlet end of said bore is connected in-line to the fluid flow circuit, said housing further having a cavity formed within said housing extending from an outer surface of said housing toward the bore of said housing;

(b) a *removable* chemically inert flexible isolation member separating said cavity and said bore, the isolation member having first and second opposed major surfaces, said first major surface being exposed to fluid flowing in the circuit, said second major surface adjacent and adjoining non-fluid conducting means for sensing a pressure within the flow circuit;

(c) said non-fluid conducting means for sensing a pressure within the flow circuit being isolated from fluid flowing in the circuit;

(d) means for constraining the isolation member and the non-fluid conducting means for sensing in a fixed position within the cavity of the housing; and (e) an electronic circuit contained within the cavity of the housing and coupled to the non-fluid conducting means for sensing a pressure within the flow circuit, whereby the electronic circuit produces an electrical signal proportional to the pressure within the bore.

2. The pressure transducer module is recited in claim 1, wherein said isolation member is manufactured from a fluorocarbon polymer.

3. The pressure transducer module as recited in claim 1, wherein said housing and said means for constraining are manufactured from a chemically inert polymer.

4. The pressure transducer module as recited in claim 3, wherein said chemically inert polymer comprises polytetrafluoroethylene.

5. The pressure transducer module as recited in claim 1, wherein the means for sensing comprises a capacitive sensor.

6. The pressure transducer module as recited in claim 1, wherein the means for sensing comprises a piezoelectric sensor.

7. The pressure transducer module as recited in claim 1, wherein the electronic circuit includes a means for adjusting the [control] *electrical* signal to compensate for fluctuations in temperature within the flow circuit.

8. The pressure transducer module as recited in claim 1, wherein said isolation member includes a plurality of channels formed on an upper surface of said isolation member, said channels extending from one edge of said member to another spaced apart edge of said member.

9. The pressure transducer module as recited in claim 1, wherein the housing further has a drain channel extending from the outer surface of the housing into the cavity between first and second sealing members.

10. The pressure transducer module is recited in claim 1, wherein said isolation member has a thickness dimension ranging between 0.001 and 0.040 inches.

11. The pressure transducer module as recited in claim 10, wherein the housing further has a drain channel extending from the outer surface of the housing into the cavity between a sealing member which seals the pressure sensor to the housing and the isolation member.

12. A chemically inert pressure transducer module adapted to be connected in-line within a chemically corrosive ultra high purity fluid flow circuit, comprising:

(a) a chemically inert housing having a bore extending through at least a portion of said housing, wherein an inlet end of said bore is connected in-line to the fluid flow circuit, said housing further having a cavity formed therein and extending from an outer surface of said housing toward the bore of said housing;

(b) a non-fluid conducting pressure sensor positioned within said cavity adjacent said bore for sensing a pressure within the fluid flow circuit;

(c) a *removable* chemically inert isolation member separating said cavity and said bore, said isolation member having first and second opposed major surfaces, said first major surface being exposed to fluid flowing in the bore, said second major surface being adjacent to and adjoining the pressure sensor to said isolation member, thereby isolating the pressure sensor from fluid communication with the bore; and (d) means for producing an electrical signal proportional to the pressure within the bore coupled to said pressure sensor.

13. The pressure transducer module as recited in claim 12, wherein the pressure sensor comprises a capacitive sensor.

14. The pressure transducer module as recited in claim 12, wherein the pressure sensor comprises a piezoelectric sensor.

15. The pressure transducer module as recited in claim 12, wherein the means for producing an electrical signal includes a means for adjusting the [control] *electrical* signal to compensate for fluctuations in temperature within the flow circuit.

16. The pressure transducer module as recited in claim 12, wherein said isolation member includes a plurality of channels formed on an upper surface of said isolation member, said channels extending form one edge of said member to another spaced apart edge of said member.

17. The pressure transducer module as recited in claim 12, wherein the housing further has a drain channel extending from the outer surface of the housing into the cavity between first and second sealing members.

18. The pressure transducer module as recited in claim 12, wherein said isolation member has a thickness dimension ranging between 0.001 and 0.040 inches.

19. A chemically inert pressure transducer module adapted to be connected in-line within a chemically corrosive ultra high purity fluid flow circuit, comprising:

(a) a chemically inert housing having a bore extending through at least a portion of said housing, wherein an inlet end of said bore is connected in-line to the fluid flow circuit, said housing further having a cavity formed therein and extending from an outer surface of said housing toward the bore of said housing:

(b) a non-fluid conducting pressure sensor positioned within said cavity adjacent said bore for sensing a pressure within the fluid flow circuit;

(c) a chemically inert isolation member separating said cavity and said bore, said isolation member having first and second opposed major surfaces, said first major surface being exposed to fluid flowing in the bore, said second major surface being adjacent to and adjoining the pressure sensor, thereby isolating the pressure sensor from fluid communication with the bore;

(d) a first sealing member to sealably engage said isolation member to said housing; and (e) a second sealing member to sealably engage said pressure sensor to said housing.

20. The pressure transducer module as recited in claim 19, wherein the housing further has a drain channel extending from the outer surface of the housing into the cavity between first and second sealing members.

21. The pressure transducer module as recited in claim 19, wherein said isolation member has a thickness dimension ranging between 0.001 and 0.040 inches.

22. A chemically inert pressure transducer module adapted to be connected in-line with a fluid flow circuit, comprising:

(a) a housing having a bore extending through at least a portion of said housing, wherein an inlet end of said bore is coupled in-line to a fluid flow circuit, said housing further having a cavity formed therein*, a drain channel extending from an outer surface of the housing into the cavity*;

(b) a removable isolation member separating the bore and cavity of said housing;

(c) a non-fluid conducting pressure sensor at least partially contained within the cavity of said housing and in contact with said isolation member; and (d) means for producing a signal proportionate to a measured pressure within the bore.

23. The pressure transducer module as recited in claim 22, wherein said housing is chemically inert.

24. The pressure transducer module as recited in claim 22, wherein the means for producing a signal includes a means for adjusting the signal to compensate for fluctuations in temperature within the flow circuit.

25. The pressure transducer module as recited in claim 22, wherein said isolation member includes a plurality of channels formed on an upper surface of said member, said channels extending from one edge of said member to another spaced apart edge of said member.

26. The pressure transducer module as recited in claim 22, wherein the non-fluid conducting pressure sensor is of a capacitive type.

27. The pressure transducer module as recited in claim 22, wherein the non-fluid conducting pressure sensor is of a piezoelectric type.

[28. The pressure transducer module as recited in claim 22, wherein the housing further has a drain channel extending from an outer surface of the housing into the cavity.]

29. The pressure transducer module as recited in claim 22, wherein said isolation member has a thickness dimension ranging between 0.001 and 0.040 inches.

30. The pressure transducer module as recited in claim 22, wherein the housing further has a drain channel extending from an outer surface of the housing into the cavity between a sealing member which seals the pressure sensor to the housing and the isolation member.

[31. The pressure transducer module as recited in claim 22, wherein said isolation member is removable.]

32. The pressure transducer module as recited in claim [31,] *30,* further including a sealing member positioned between said isolation member and said housing.

*33. A chemically inert pressure transducer module adapted to be connected in-line within a chemically corrosive ultra high purity fluid flow circuit, said module comprising:*

*(a) a housing having a bore extending through at least a portion of said housing wherein an inlet end of said bore is adaptable for connection to the fluid flow circuit;*

*(b) a non-fluid conducting pressure sensor positioned within said housing for sensing a pressure within the fluid flow circuit;*

*(c) an isolation member isolating said pressure sensor within said housing from said bore, said isolation member having first and second opposed major surfaces, said first major surface being exposed to fluid flowing in the bore, said second major surface supporting the pressure sensor;*

*(d) means for producing an electrical signal proportional to the pressure within the bore coupled to said pressure sensor; and*

*(e) a vent extending from an outer surface of said housing into a chamber of said housing, wherein a portion of said pressure sensor is isolated within said chamber.*

*34. The pressure transducer module as recited in claim 33, wherein the pressure sensor comprises a capacitive sensor.*

*35. The pressure transducer module as recited in claim 33, wherein the pressure sensor comprises a piezoelectric sensor.*

*36. The pressure transducer module as cited in claim 33, wherein the means for producing an electrical signal includes a means for adjusting the electrical signal to compensate for fluctuations in temperature within the flow circuit.*

*37. The pressure transducer module as recited in claim 33, wherein said isolation member includes a plurality of channels formed on an upper surface of said isolation member, said channels extending from one edge of said member to another spaced apart edge of said member.*

*38. The pressure transducer module as recited in claim 33, wherein said vent extends into said chamber of said housing between first and second sealing members.*

*39. The pressure transducer module as recited in claim 33, wherein said isolation member has a thickness dimension ranging between 0.001 and 0.040 inches.*

*40. A chemically inert pressure transducer module adapted to be connected in-line within a chemically corrosive ultra high purity fluid flow circuit, said pressure transducer module comprising:*

*(a) a housing having a bore extending through at least a portion of said housing, wherein an inlet end of said bore is adaptable for connection to a fluid flow circuit;*

*(b) a non-fluid conducting pressure sensor positioned within said housing for sensing a pressure within the fluid flow circuit;*

*(c) an isolation member isolating said pressure sensor within said housing, said isolation member having first and second opposed major surfaces, said first major surface being exposed to fluid flowing in the bore, said second major surface supporting the pressure sensor, thereby isolating the pressure sensor from fluid communication with the bore;*

*(d) a vent extending from an outer surface of said housing into a first chamber of said housing, wherein a portion of said pressure sensor is isolated within said first chamber from a remainder of an internal portion of said housing; and*

*(e) an electrical circuit contained within a second chamber of said housing and coupled to said pressure sensor, said electrical circuit produces an electrical signal proportional to the pressure within the bore.*

*41. The pressure transducer module as recited in claim 40, wherein the pressure sensor comprises a capacitive sensor.*

*42. The pressure transducer module as recited in claim 40, wherein the pressure sensor comprises a piezoelectric sensor.*

*43. The pressure transducer module as recited in claim 40, wherein the electrical circuit includes a means for adjusting the electrical signal to compensate for fluctuations in temperature within the flow circuit.*

*44. The pressure transducer module as recited in claim 40, wherein said isolation member includes a plurality of channels formed on an upper surface of said isolation member, said channels extending from one edge of said member to another spaced apart edge of said member.*

*45. The pressure transducer module as recited in claim 40, wherein said vent extends into said chamber of said housing between first and second sealing members.*

*46. The pressure transducer module as recited in claim 40, wherein said isolation member has a thickness dimension ranging between 0.001 and 0.040 inches.*

*47. The pressure transducer module as recited in claim 40, further including a second vent extending from an external surface of said housing into said second chamber.*

* * * * *